Patented Aug. 4, 1942

2,291,804

UNITED STATES PATENT OFFICE 2,291,804

ALKYLATION OF PHENOLS

William S. Gump, Nutley, N. J., assignor to Burton T. Bush, Inc., New York, N. Y., a corporation of New Jersey No Drawing. Application December 8, 1939, Serial No. 308,167

8 Claims. (Cl. 260—624)

This invention relates to alkylated phenols and a new method of producing them. More particularly it refers to the alkylation of phenols by reacting the latter with aliphatic ethers in the presence of suitable condensation and dehydration agents.

An object of this invention is to produce alkylated phenols by a simple and convenient process. Another object is the adaptation of the process to commercial usage. The advancement of the art is a further object.

The alkylation of phenols has been effected by various methods. It is well known to react an olefin with a phenol. Such a reaction generally requires the application of high temperatures and pressures. The attendant disadvantages of these conditions are obvious. Phenols have also been alkylated by reacting them with alcohols. These reactions proceed at high temperatures, usually well above the boiling point of the alcohol employed, and are conducted under pressure. Closed containers are needed to avoid the loss of alcohol or the volatile by-products which are formed. Also worthy of note is the fact that the water formed during the condensation retards further reaction because the water is retained in the reaction mixture.

A method of alkylating a phenol by reacting it with an alcohol and removing the water of condensation as its forms is also known. However, it is found that considerable amounts of phenol and alcohol are likewise removed from the reaction mixture along the water. This alcohol-water-phenol condensate is objectionable. The cost and difficulty involved in recovering the phenol and alcohol must be considered. The yield of alkylated phenol based on the amount of phenol charged into the reaction chamber is adversely affected naturally when non-alkylated phenol is removed from the reaction vessel along with water.

I have now found that the alkylation of a phenol can be conducted under atmospheric pressure simply by maintaining the phenol and a suitable condensation and dehydration agent at an elevated temperature and gradually adding an ether, preferably while agitating the reaction mixture. An ether-water distillate is obtained, the water distilling as soon as it forms. The water condensate is collected in a receiver having suitable separation means and is allowed to settle to the bottom thereof before being drawn off. As will be apparent to those chemists skilled in the art, the ether is continuously and automatically returned to the reaction chamber. My process results in high yields of alkylated phenols. The immiscibility of the water-ether condensate is also an advantageous factor of my process. Furthermore, the higher alkylating value of ethers as compared to that of the corresponding alcohols is favorable. In this connection may be mentioned the fact that the efficacy of ether condensations as employed by the processes of this invention was not to be foreseen as it is well known to chemists that ethers are not very active chemically.

While this invention can be practiced under superatmospheric pressure, I prefer to operate under normal conditions. The apparatus adaptable for carrying out reactions under atmospheric pressure is considerably cheaper, and simpler in construction and design than that required for pressure reactions. Moreover, the hazard of heating inflammable and toxic ingredients under pressure is obviated.

I have employed numerous phenols in the processes of this invention. It may be said that, as a general rule, any phenol which can be alkylated to form an alkyl phenol by combination with an olefin is suitable. As examples of such phenols may be mentioned: phenol, cresols, chlorphenols, chlorcresols, xylenols, naphthols, hydroquinone, resorcinol, etc.

The ethers which may be employed in my process are those which are members of the class which may be represented by the formula

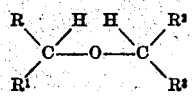

wherein R, R$^1$, R$^2$ and R$^3$ are alkyl radicals. It is understood that these radicals may be the same or different. Ethers which are particularly suitable are isopropyl ether and secondary butyl ether.

A number of substances may be used, either alone or in admixture, to aid the reactions of this invention. The term herein employed to denote such materials is condensation and dehydration agents. As examples of such substances, I mention contact substances such as acid-activated bleaching earths, e. g., "Tonsil"; metal salts, such as ferric chloride, aluminum chloride, zinc chloride, aluminum sulphate and potassium bisulphate; sulfuric acid and phosphoric acids; metal oxides, such as aluminum, thorium and tungstic oxides; and heteropolyacids, such as phosphomolybdic acid, silicotungstic acids, and the like.

The proportion of the ingredients may be varied over wide limits. I prefer to add about 0.5–1.0 mol of ether to each mol of the phenolic body mixed with 1–60% of condensation and dehydration agent based on the weight of the phenol. The amount of ether employed depends on the desired degree of alkylation of the phenol, i. e., whether the phenol is to be monoalkylated, dialkylated, etc. When agents such as sulfuric acid are used, 1–5% thereof is sufficient. Agents such as "Tonsil" and zinc chloride are employed in greater amounts.

In conducting my process I heat the phenol and condensation and dehydration agent to the desired temperature. The ether is then added slowly, usually while the reaction mixture is agitated. The rate of addition of the ether depends upon the temperature desired, it being obvious that too rapid a rate will cause a reduction in temperature. The water formed by the reaction distills as soon as it forms and is removed from the reaction vessel as hereinbefore stated.

The temperature at which the reaction may be effected varies, depending upon the ingredients used. I have found temperatures between 135°–200° C. preferable although temperatures up to the boiling point of the reaction mixture can be employed.

Inasmuch as small amounts of phenyl alkyl ethers may sometimes be formed in these reactions, it is preferred to continue the heating after the cessation of water distillation. Temperatures of at least 170° C. are usually employed and the heating continued until the ethers are isomerized to alkylated phenols. After the particular heating treatment used, the reaction mixture is cooled, the condensation and dehydration agent removed therefrom, and the alkylated phenols recovered by suitable means.

Zinc chloride, acid-activated bleaching earths or the like may be recovered by filtration and reused.

Agitation of the reaction mixture is desirable but not required in all cases. Liquid or somewhat soluble condensation and dehydration agents such as sulfuric acid and zinc chloride give good results in the absence of agitation. It is found that insoluble or difficultly-soluble agents such as the acid-activated bleaching earths cannot be employed to good advantage without agitation because they settle to the bottom of the reaction mixture.

The invention is illustrated by the following examples without, however, limiting the same to them.

Example 1

A mixture of 324 grams (3 mols) of o-cresol and 38 grams of "Tonsil" is heated to about 160° C. at atmospheric pressure. The mixture is stirred and a temperature of 160–165° C. is maintained while 170 grams (about 10% in excess of 1½ mols) of isopropyl ether are slowly introduced. The ether addition requires about 4 hours. The water of reaction is carried over by the ether vapors as fast as it forms and it is removed by means of a trap, the ether being returned to the reaction vessel continuously and automatically. When the distillation of water ceases the temperature is raised to 180°–185° C. and maintained thereat for about 3 hours or until the desired reaction is substantially complete. After cooling, the oil is filtered from the "Tonsil" and purified by fractional distillation at reduced pressure. The "Tonsil" may be re-used for subsequent reactions. The vacuum distillation yields 102 grams unchanged o-cresol and 296 grams of isopropylated o-cresols boiling from 86° to 116° C. at 5 mm. pressure and consisting of carvacrol and isomeric monoisopropyl-o-cresols and a small amount of di-isopropyl-o-cresols. By careful fractionation, 3,5-di-isopropyl-2-methyl phenol m. p. 75° C., white needles, may be isolated from the diisopropyl-o-cresol fraction. The yield of isopropylated o-cresols corresponds to more than 96% of the theoretical, based on the o-cresol consumed by reaction.

Example 2

216 grams of a mixture of 60% m-cresol and 40% p-cresol and 65 grams of anhydrous zinc chloride are heated to 165° C. and stirred. At a temperature of 165°–170°, 225 grams of isopropyl ether are introduced, the ether addition requiring 4 hours. The water formed during the reaction is removed automatically and continuously according to the procedure of Example 1. After all of the isopropyl ether has been added the heating is continued at 180–190° C. for 3 hours. After cooling, the oil is filtered off from the zinc chloride and fractionally distilled in vacuo. 9.6 grams of unchanged m-p-cresol are recovered and 338 grams of a liquid mixture boiling from 95° C. to 130° C. at 4 mm. pressure and consisting mainly of di-isopropyl-m-cresols and di-isopropyl-p-cresols is obtained. This is a yield of 92% of the theoretical, based on the weight of cresols consumed by reaction. The zinc chloride may be re-used for subsequent batches.

Example 3

216 grams of p-cresol and 65 grams of anhydrous zinc chloride are heated to 160°–165° C. and at this temperature, 110 grams of isopropyl ether are added during 4 hours without stirring. The water formed is removed automatically and continuously according to the procedure of Example 1. The reaction mixture is then heated at 190° C. for 3 hours. After cooling, the oil is washed free from zinc chloride by means of water and subjected to fractional vacuum distillation whereby 38 grams of p-cresol and 217 grams of an oil boiling from 85° C. to 120° C. at 4 mm. pressure and consisting of mono isopropyl-p-cresols and a small amount of di-isopropyl-p-cresols is obtained. This is a yield of 88% of the theoretical, based on the weight of cresol consumed by reaction. One of the di-isopropyl-p-cresols which may be isolated is 3,5-di-isopropyl-4-methyl phenol in the form of white needles having a melting point of 94° C.

Example 4

216 grams of m-cresol and 12 grams of concentrated sulfuric acid are heated to 160°–165° C. and stirred. This mixture is reacted with 110 grams of isopropyl ether according to the procedure of Example 1. The reaction product is then washed with water until free of sulfuric acid and fractionally distilled in vacuo. 32 grams of m-cresol and 208 grams of an oil boiling from 84° C. to 115° C. at 3 mm. pressure and consisting mainly of thymol and isomeric mono isopropyl-m-cresols are obtained. This corresponds to a yield of 81.5% of the theoretical, based on the weight of cresol consumed by reaction.

Example 5

125 grams of phenol and 40 grams of anhydrous zinc chloride are heated to 170° C. and stirred. At a temperature of 165°–170° C., 86 grams of secondary butyl ether are added during 4 hours and the reaction mixture is then heated to 185°–190° C. for 4 hours. Water being formed is removed according to the procedure of Example 1. After cooling and separation from zinc chloride the oil is fractionally distilled under reduced pressure. 42 grams of phenol and 116 grams of an oil boiling from 90° C. to 118° C. at 4 mm. pressure and consisting mainly of ortho secondary butyl phenol and para secondary butyl phenol are recovered. The yield of alkylated phenols is 87.5% of the theoretical, based on the weight of phenol consumed by reaction.

*Example 6*

143 grams of parachlor meta cresol and 30 grams of "Tonsil" are heated to 160° C. and stirred. During 2 hours, 53 grams of isopropyl ether are added and the water of reaction is removed according to the procedure of Example 1. Heating is then continued for 3 hours at 185° C. After cooling, the oil is filtered from the "Tonsil" and fractionally distilled. At 4 mm. pressure, 78 grams, boiling at 90° to 110° C. and consisting mainly of unchanged parachlor meta cresol and 47 grams, boiling at 110°–120° C. and consisting mainly of chlor thymol are obtained. The yield of chlor thymol is 56% of the theoretical, based on the weight of chlor cresol consumed by reaction.

*Example 7*

110 grams of hydroquinone and 20 g. of "Tonsil" are heated to 175°; when hydroquinone has melted, 102 grams of isopropyl ether are added to the stirred mixture during 2 hours and water of reaction is removed according to procedure of Example 1. After addition of the isopropyl ether, the heating is continued for 3 hours at 180°–195° C. After cooling to about 75° C., 600 cc. of ethylene dichloride are added and the solution is filtered. On standing, a light brown, crystalline product separates which is filtered off and dried (weight 89 grams). By repeated recrystallization from water whereby higher isopropylated compounds remain insoluble, isopropyl hydroquinone is obtained in form of white, slender needles, melting at 130° C

*Example 8*

122 grams of sym. xylenol and 65 grams of anhydrous zinc chloride are heated to 160° C. and stirred. 105 grams of isopropyl ether is reacted upon the mixture according to the procedure of Example 1. Because the products in the reaction vessel form a heavy paste, water and 200 cc. of toluol are added thereto and the toluol solution is then washed neutral. After removal of the toluol, the residue is fractionally distilled in vacuo. 54 grams of sym. xylenol are recovered and 116 grams, boiling at 110°–120° C. at 6 mm. pressure, are collected. This fraction consists mostly of yellow crystals and corresponds to a theoretical yield. Recrystallized from naphtha, a di-isopropyl-sym. xylenol of M. P. 94° is obtained.

I claim as my invention:

1. In the method of making isopropylated o-cresols by reacting o-cresol with isopropyl ether, the steps which comprise seating the phenolic material and the condensation and dehydration agent to a temperature of at least 135° C. under atmospheric pressure, maintaining a temperature of at least 135° C. in the reaction mixture while adding said ether thereto, and removing water from the reaction mixture as the water is formed.

2. In the method of making isopropyl phenols by reacting a phenol with isopropyl ether, the steps which comprise heating the phenolic material and the condensation and dehydration agent to a temperature of at least 135° C. under atmospheric pressure, maintaining a temperature of at least 135° C. in the reaction mixture while adding said ether thereto, and removing water from the reaction mixture as the water is formed.

3. In the method of alkylating a phenol by reacting it with an aliphatic ether selected from the class represented by the formula

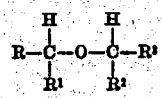

wherein R, R¹, R², and R³ are alkyl radicals and the total number of carbon atoms in said ether is not less than 6 and not more than 8, the steps which comprise heating the phenolic material and the condensation and dehydration agent to a temperature of at least 135° C. under atmospheric pressure, maintaining a temperature of at least 135° C. in the reaction mixture while adding said ether thereto, and removing water from the reaction mixture as the water is formed.

4. In the method of making secondary butyl phenols by reacting a phenol with secondary butyl ether, the steps which comprise heating the phenolic material and the condensation and dehydration agent to a temperature of at least 135° C. under atmospheric pressure, maintaining a temperature of at least 135° C. in the reaction mixture while adding said ether thereto, and removing water from the reaction mixture as the water is formed.

5. In the method of making isopropylated o-cresols by reacting o-cresol with isopropyl ether, the steps which comprise heating the phenolic material and the condensation and dehydration agent to a temperature of at least 135° C. under atmospheric pressure, maintaining a temperature of at least 135° C. in the reaction mixture while adding said ether thereto, removing water from the reaction mixture as the water is formed, and after the distillation of water has ceased, continuing the heating at a temperature of at least 170° C. until the desired reaction is substantially complete.

6. In the method of making isopropyl phenols by reacting a phenol with isopropyl ether, the steps which comprise heating the phenolic material and the condensation and dehydration agent to a temperature of at least 135° C. under atmospheric pressure maintaining a temperature of at least 135° C. in the reaction mixture while adding said ether thereto, removing water from the reaction mixture as the water is formed, and after the distillation of water has ceased, continuing the heating at a temperature of at least 170° C. until the desired reaction is substantially complete.

7. In the method of alkylating a phenol by reacting it with an aliphatic ether selected from the class represented by the formula

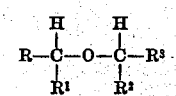

wherein R, R¹, R² and R³ are alkyl radicals and the total number of carbon atoms in said ether is not less than 6 and not more than 8, the steps which comprise heating the phenolic material and the condensation and dehydration agent to a temperature of at least 135° C. under atmospheric pressure, maintaining a temperature of at least 135° C. in the reaction mixture while adding said ether thereto, removing water from the reaction mixture as the water is formed, and after the distillation of water has ceased, continuing the heating at a temperature of at least 170° C. until the desired reaction is substantially complete.

8. In the method of making secondary butyl phenols by reacting a phenol with secondary butyl ether, the steps which comprise heating the phenolic material and the condensation and dehydration agent to a temperature of at least 135° C. under atmospheric pressure, maintaining a temperature of at least 135° C. in the reaction mixture while adding said ether thereto, removing water from the reaction mixture as the water is formed, and after the distillation of water has ceased, continuing the heating at a temperature of at least 170° C. until the desired reaction is substantially complete.

WILLIAM S. GUMP.